US005222382A

United States Patent [19]

De Vizzi

[11] Patent Number: 5,222,382

[45] Date of Patent: Jun. 29, 1993

[54] LOCKING DEVICE FOR LOCKING A ROTARY DEVICE OF ELECTROMECHANICAL EQUIPMENT

[75] Inventor: Francesco De Vizzi, San Giuliano Milanese, Italy

[73] Assignee: CGE Compagnia Generale Elettromeccancia SPA, Milan, Italy

[21] Appl. No.: 680,670

[22] Filed: Apr. 4, 1991

[30] Foreign Application Priority Data

Apr. 4, 1990 [IT] Italy .............................. 19946 A/90

[51] Int. Cl.[5] ........................ E05B 13/10; F16K 35/10

[52] U.S. Cl. ........................................ 70/212; 70/203; 70/180

[58] Field of Search .......................... 70/203, 209–212, 70/224, 180, 174, 177

[56] References Cited

U.S. PATENT DOCUMENTS

| | | | |
|---|---|---|---|
| 2,672,746 | 3/1954 | Arens | 70/210 |
| 2,695,934 | 11/1954 | Wills | 70/212 X |
| 2,748,589 | 6/1956 | Hulslander | 70/180 |
| 2,939,308 | 6/1960 | Trammell, Jr. | 70/211 X |
| 3,022,391 | 2/1962 | Oravec | 70/212 X |
| 3,179,759 | 4/1965 | Rice et al. | 70/212 X |
| 3,312,794 | 4/1967 | Hollyday | 70/212 X |
| 3,500,668 | 3/1970 | Henry | 70/212 |
| 3,865,130 | 2/1975 | Mullis | 70/203 X |
| 5,003,797 | 4/1991 | Wirth et al. | 70/203 X |
| 5,014,528 | 5/1991 | Roberts | 70/203 X |

FOREIGN PATENT DOCUMENTS

| | | | |
|---|---|---|---|
| 0412023 | 2/1991 | European Pat. Off. . | |
| 1952458 | 12/1966 | Fed. Rep. of Germany . | |
| 1665604 | 3/1971 | Fed. Rep. of Germany . | |
| 2399111 | 2/1979 | France . | |
| 201545 | 2/1966 | Sweden | 70/177 X |
| 639687 | 7/1950 | United Kingdom | 70/212 |

*Primary Examiner*—Peter M. Cuomo
*Assistant Examiner*—Suzanne L. Dino
*Attorney, Agent, or Firm*—Helfgott & Karas

[57] ABSTRACT

A locking device is provided with a padlocking arrangement which includes a shiftable or pivotable latch lever cooperating with at least one padlock member, and a padlocking enabling member fit on a shaft of square cross-section connected to an electromechanical equipment to be controlled and inserted into a bore formed in a hub of a rotating control handle. The bore is formed by two superimposed circumferentially offset square openings receiving the shaft with clearance to permit a slight angular movement of the shaft and the padlocking enabling member thereon to cause disengagement of the latch lever from the padlocking enabling member.

9 Claims, 8 Drawing Sheets

LOCKING DEVICE FOR LOCKING A ROTARY DEVICE OF ELECTROMECHANICAL EQUIPMENT

BACKGROUND OF THE INVENTION

The present invention relates to a padlock type locking device provided for control devices of electromechanical equipments, and more particularly of circuit breakers.

The so-called padlocking devices allow to lock, by means of a padlock, a handle of a circuit breaker in an open position. The padlocking operation must be possible only when the contacts of the circuit breaker are actually open, as required by safety rules.

There are conventional circuit breakers in which it is possible to drive a control lever of such a circuit breaker in an open position even if the contacts of the circuit breaker are welded. However, in such a case, the control lever has a tendency to move back to a closed position or to intermediate positions between the closed and the open positions.

When means to convert a linear alternating movement of the control lever to a rotating movement of a handle are provided on a circuit breaker, it can happen that the control lever can be moved into a padlocking position and locked therein, giving the impression that the circuit breaker has open contacts, while they could remain closed owing, for example, to welding.

SUMMARY OF THE INVENTION

It is an object of the present invention to provide a padlock-type locking device, applicable to rotating handles of control circuit breakers and operating only when the circuit breaker is in an open position and its contacts are actually open.

Another object of the present invention is to provide a padlock-type locking device capable of preventing the padlocking when after the control lever has been moved to a lockable position, the lever was pressed to force the handle into a padlocking position, by overcoming forces resisting the operation, when the contacts of the circuit breaker are not actually open.

The above and other objects are attained by a locking device for a rotating control device of electromechanical equipments, such as electric circuit breakers, wherein the blocking, by means of a padlock of a rotating control handle is allowed only when the equipment controlled by the control itself has properly opened contacts. The padlocking device is connected between two mechanical linkage members so that in a properly open and non-forced position, the padlocking device is advanced to a padlockable position, while in a non-properly open and forced position, a clearance between a first and a second linkage member does not allow the advancement of the padlocking device into the lockable position.

Preferably, the locking device is provided, wherein the rotating control handle includes a handgrip connected to a hub which has a double square bore formed by two squares which are superimposed and circumferentially offset one relative to another and wherein a shaft of square cross-section is inserted in the bore, the shaft having sides slightly smaller than the sides of said bore and being provided with a padlocking enabling member which, in properly open positions, makes the latch device clear from a finger of the padlocking enabling member, while in improper opening positions, for example due to contact welding, causes the device to cooperate with said finger.

The locking device, wherein the square shaft is tightly fit in a corresponding central bore of the padlocking enabling member, has the padlocking enabling member which includes a disk provided with a first substantially radially arranged planar finger and a second square finger, said first finger operating as an interference member with the padlocking device to prevent the rotation of lever arms of the latch around a fulcrum. This rotation is prevented by an engagement of an end of one of the lever arms with the first finger when, after an opening operation of the rotating handle, the contacts of the electromechanical equipment are not open, and the forcing of the lever to an opening position would shift the handle having said double square bore so that, by overcoming the force of a spring abutting between an internal slot in a hub of the handle and the square finger of the padlocking enabling member, the end of the lever arm would move over the first finger of the disk which would remain prevented from descending into a slot in a cover of the circuit breaker to allow the padlocking of the rotating handle.

Preferably, in the padlocking device according to the invention, the lever arm is provided with a padlocking bracket having a slot wherein one or more padlock protrusions or bows can be inserted when the lever arm is liftable in a lockable position.

Alternatively, the padlocking device is provided, wherein the shaft is tightly inserted in a corresponding central bore of the padlocking enabling member; that member has a disk provided with a first square padlocking finger and a second square finger connected to the disk and provided on the opposite side of the disk with respect to the first finger, said first finger operating as an interference member with the padlocking device to prevent the entry of a latch lever end in a slot and shifting of said latch within the rotating handle, for clearing padlocking holes from the latch fingers because of an abutment of said end against said first finger which occurs when, after an opening operation of the rotary handle, the contacts of the electromechanical equipment do not open, and the forcing of the handle to an open position makes the hub with the double square bore shifted, so that, by overcoming the force of a spring extending between a slot in the hub of the handle and the second square finger of the padlocking enabling member, the latch lever end moves against said first finger of the disk but is prevented from coming into a slot in the cover to allow the padlocking of the rotary handle.

The latch lever may be pushed by a spring to a protruding position, to cause the padlocking only at will by pushing the latch lever against the force of said spring and provided that the first finger of the disk does not interfere with the end of the latch lever.

The rotating control handle may have a handgrip connected to a hub, and which can rotate with respect to the padlocking enabling member through a predetermined angle, wherein a square shaft is tightly inserted in the hub, extending into a central bore thereof, shaped as two superimposed, circumferentially offset squares pierced through the center of the padlocking enabling member formed as a disk peripherally provided with a raised cam profile portion interrupted by a depression corresponding to a limited angular sector of said cam profile portion, said member being also connected to a mechanism for transmitting a rotary movement to an electrical equipment, said raised cam profile portion having an abutting slider, which, when abuts against a high region of said cam profile portion, comes out from a cover to fill a slot, accommodating a padlocking device, to prevent the entry of said latch lever into said slot.

The latch may be provided with a recess aligning with a corresponding window through said handle for passing a blocking (padlock) member, for example a padlock bow, when the lever is rotated to the open position and the contacts of the electrical equipment are properly moved into the open position, allowing the depression of the cam profile portion to move under the slider so that said slider clears the slot permitting a latch lever end to entry into the slot.

The latch may be held by a spring in a protruding position, closing the window and in order to clear the window, must be forcibly driven to the inside to be moved only if the padlocking conditions are met, i.e. the rotary handle is in open position and the contacts of the controlled equipment are properly open.

The features and the advantages of the present invention will be made more apparent by the following detailed description of some embodiments thereof, not to be considered in limiting sense, provided with the enclosed drawing.

DETAILED DESCRIPTION OF THE PREFERRED EMBODIMENTS

Figure 1:
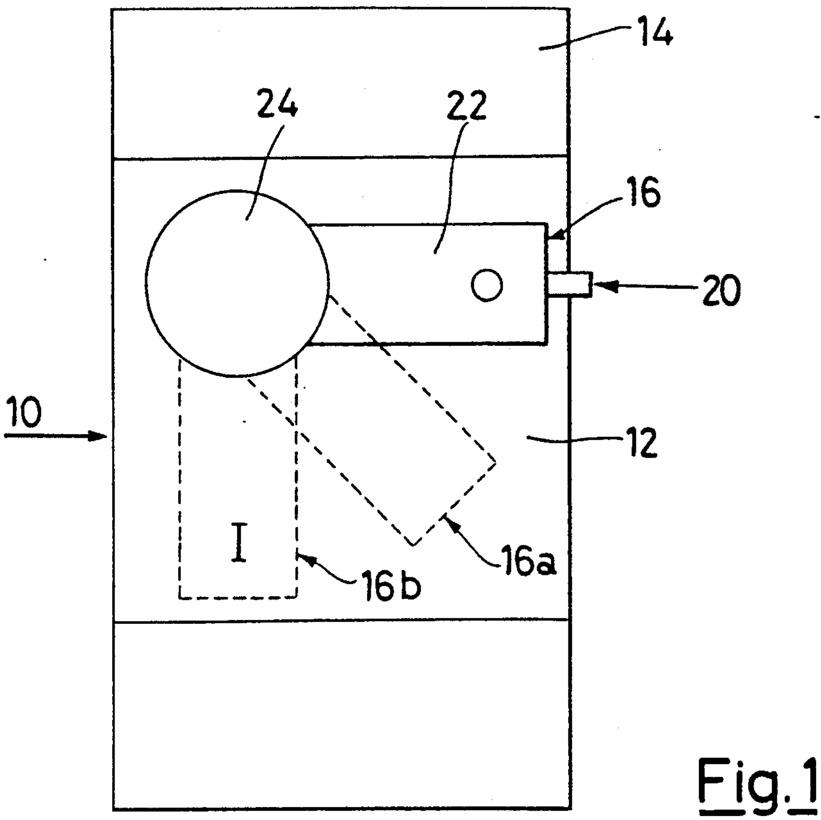
FIG. 1 is a diagrammatic front view of a rotating control for a circuit breaker with a device according to the present invention.
Figure 2:
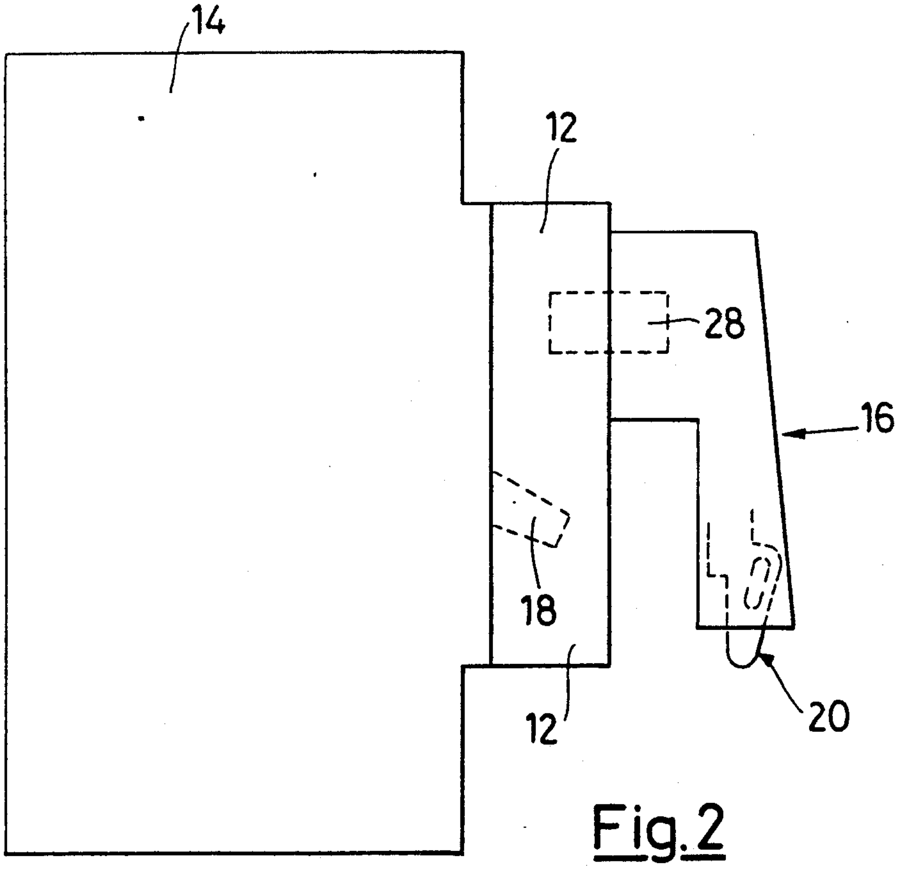
FIG. 2 is a diagrammatic side view of the rotating control of FIG. 1.

Referring to FIGS. 1 and 2, it is seen that a rotary control device 10 according to the invention includes a box-like cover 12 which is connected to an electrical equipment 14, for example an electric circuit breaker which has a mechanism to carry out control movements of the electric equipment by a rotating handle 16 of the control device 10. Handle 16 is rotated to subsequent positions 16*a* and 16*b* shown in dotted lines. Position 16 (shown in solid lines) corresponds to a position of open contacts in the circuit breaker. Position 16*b* corresponds to a closed position of the contacts and position 16*a* is an intermediate position between the open position 16 and the closed position 16*b*.

As it is commonly known in this art, a rotating control device operates to transform a rotary movement of a control handle 16 into a linear alternating movement of a control lever 18 of an equipment such as the circuit breaker.

A device providing said transformation of the movement is known and thus not disclosed, herein, because it is not part of the present invention. The present invention relates to a padlocking device 20 (i.e. a device accommodating a padlock and which is lockable by the same) of the rotating handle 16, which is actuated only when lever 18 is in the position corresponding to open contacts of the circuit breaker to lock the handle 16 and thus the contacts in their open position.

As it may happen that, for some reasons, the contacts of the breaker do not open when it is desired, for example, when a preceding overcurrent welded the contacts, the padlocking of the handle 16 would be impossible when the contacts of the breaker do not open on command.

Reference is now made to FIGS. 3 to 6 and 11, which show a first embodiment of the present invention.

As seen from FIGS. 3–6, handle 16 is comprised of a handgrip 22 connected to a hub 24 centrally provided with a hollow seat 26, housing with some clearance a shaft 28 of square cross-section, provided for connection to a mechanism for providing a transformation movement (not shown), housed in the box-like cover 12 (as shown in FIGS. 1 and 2).

On the shaft 28, is installed a padlocking enabling member 30 (shown in detail in FIG. 11) comprised of a disk 32 provided with a central bore 34 tightly fit on the shaft 28, a first planar finger 36 and a second finger 38 of square configuration. Member 30 is formed so as to allow the padlocking only when conditions preventing the contact opening of the electric equipment or breaker 14 do not exist and to prevent the padlocking when desired. Hub 24 of the handle 16 is provided with a slot 40 housing a spring 42 abutting with a first end thereof against a wall of the slot and with the other end against the square-shaped finger 38 of the enabling member 30. The planar finger 36 cooperates with the padlocking device 20 which is comprised of a lever 47, rotatable about a fulcrum 48 and comprising a first arm 50 and a second arm 52. The first arm 50 is provided with an enlarged portion or bracket 54 having an opening 54*a*, housing a padlock member 55, such as a bow-like portion. The second arm 52 has a distal end 56 abutting against finger 36 to prevent the padlocking. In the box-like cover 12, there is a slot 57, aligned with the opening position of the handle 16. The end 56 of the arm 52 can penetrate into slot 57 providing the fastening of the handle 16 with respect to the cover 12 and, when the bracket 54 is out of the handgrip 22, permitting the insertion of the padlock member 55 into slot 54*a* of the bracket, thus providing the padlocking.

Figure 3:
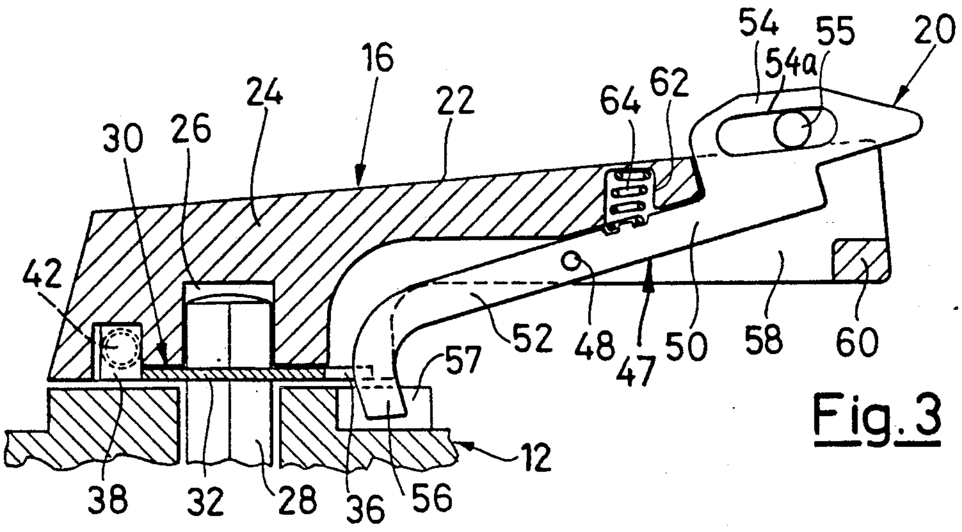
FIG. 3 is a sectional view of a rotating control handle of a first embodiment of a padlocking enabling device according to the present invention in a lockable position.
Figure 4:
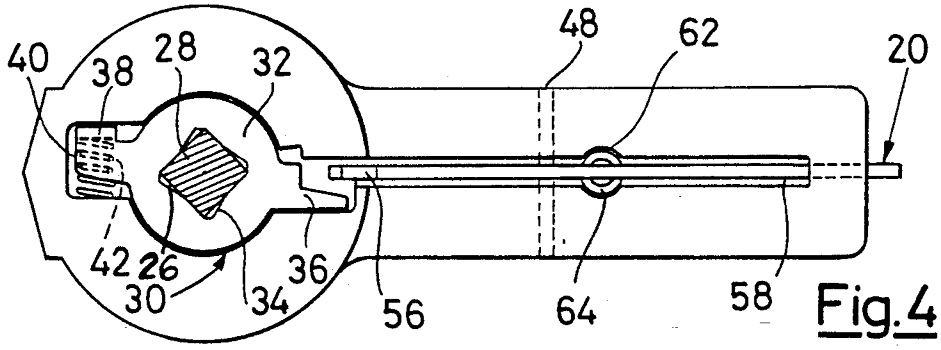
FIG. 4 is a sectional view of the handle of FIG. 3, also in a lockable position.
Figure 5:
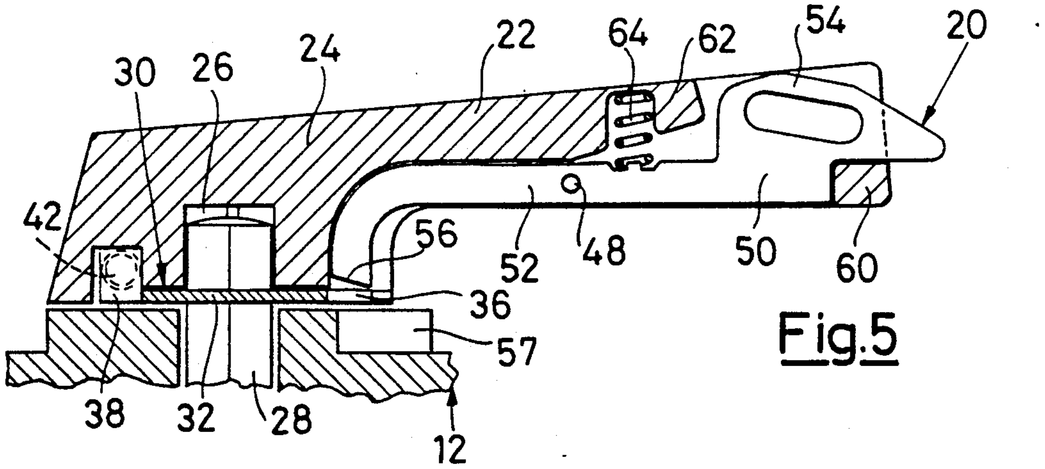
FIG. 5 is a sectional view of the handle of FIG. 3 in a non-lockable position.

In case of a normal operation, without any problems in the circuit breaker 14, when the control handle 16 is brought into the opening position, the positioning of lever 18 of the circuit breaker to an opening arrangement will move shaft 28 and thus the enabling member 30 into the position shown in the FIGS. 3 and 4, because, when shaft 28 is in the exact position corresponding to a contact opening position in the circuit breaker 14, handle 16 should not be forced further to reach the opening position and, as a consequence, the spring 42 freely operates in the slot 40, bringing handle 16 into the open position in which the end 56 of arm 52 of lever 47 can penetrate into the slot 57 of cover 12 and, as a result, the bracket 54 can be lifted out of engagement with the handgrip 22 for housing the padlock member 55.

As also shown in FIGS. 3 to 6, the padlocking device 20 is housed in an elongated slot 58 provided in the handgrip 22. The front end of this slot is closed by a support cross-bar 60 of the handgrip. The latter also has a seat or recess 62 which houses a push spring 64, for maintaining the padlocking device in the position shown in the FIGS. 5 and 6, i.e. in a non-lockable position. The padlocking can be possible only when the handgrip 22 is in the position shown in the FIGS. 3 and 4 because only in this position the first arm 50 may be lifted for allowing the bracket 54 to come out from the slot 58 to allow the introduction thereinto of the padlock member 55. As has been described above, end 56 can penetrate into the slot 57 only if there are no falts in controlling the contacts of the circuit breaker controlled by the rotary handle, as it will be explained herebelow.

The seat or recess 26, formed in the hub 24 of handle 16, has a cross-section of two superimposed squares each circumferentially offset relative to the other and having sides being a little larger (for example, by 1 mm) than the sides of the square shaft 28 in order to have an effect similar to that when it is attempted to drive a nut or a bolt by means of a wrench and the wrench angularly moves idly before engaging the nut or bolt. Likewise, handle 16 when it rotates in one direction, engages the sides of one of the squares defining seat 26, and when it rotates in the other direction, engages the sides of the other square, so that some amount of rotational movement of handle 16 with respect to the square shaft 28 always exists. If the handgrip 22 of handle 16 is not forcefully driven, spring 42, which extends between the wall of the slot 40 and finger 38 of the enabling member 30, positions finger 36 according to the orientation shown in the FIGS. 3 and 4, so as to leave room for the end of the lever arm 52 to penetrate into the slot 57 of the cover 12, when the circuit breaker is properly open, and to allow the lifting of the bracket 54 in the upward direction in order to let the padlock number 55 to penetrate into slot 54*a*.

Figure 6:
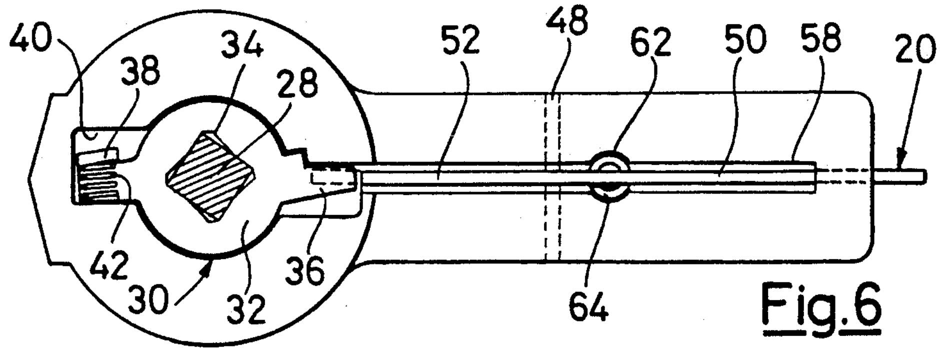
FIG. 6 is a view from the underside of the handle depicted in FIG. 5, also in a non-lockable position.

When a malfunction in the breaker 14, such as contact welding, takes place, such a malfunction prevents a free movement of all the elements connected to the breaker. These elements are shaft 28 which could not freely reach the position corresponding to a breaker contact opening position and, consequently, handle 16 in the open position cannot be positioned in the direction corresponding to the opening position in which the padlocking is possible. An attempt to force handle 16 into the opening position would only turn seat 26 with respect to the shaft 28, compelling the wall of the slot 40 to move and to abut against spring 42, which will distort, as shown in FIG. 6, while the arm 52, having its end 56 abutting against finger 36 would not descend, preventing the padlocking of the handle 16, because it would be impossible to disengage bracket 54 from slot 58 in the handgrip 22.

Reference is now made to FIGS. 7 to 10 and 12 depicting a second embodiment of the present invention.

As is seen in FIGS. 7–10, handle 16 is comprised of handgrip 22 connected to hub 24 centrally provided with a hollow recess or seat 26 housing, with some clearance, shaft 28 connected to a mechanism for the transformation movement, known and mentioned above (not shown) and housed in the box-like cover 12.

A padlocking enabling member 70 (shown in detail in FIG. 12) is provided on the square shaft 28. Member 70 including a disk 72 is provided with a square central bore 74 and tightly fits on the square shaft 28, and has a first square padlocking finger 76 and a second square finger 78 to allow the padlocking only when any conditions preventing the opening of the contacts in the circuit breaker 14 do not exist and to prevent the padlocking when such conditions do exist. Hub 24 of handle 16 is provided with a slot 80 housing a spring 82 abutting with an end thereof against a wall 80*a* of the slot and with the other end against the square finger 78 of the enable member 70. The square enabling padlocking finger 76 cooperates with the padlocking device 20*a* (FIG. 7) comprising a latch 92 driven to longitudinally slide in the direction of elongation of handgrip 22 by two pins 88*a* and 88*b* housed in two slots 90*a* and 90*b* and padlocking protrusions 94*a*, 94*b* and 94*c* outwardly projecting from the latch 92 for covering and clearing holes 95*a*, 95*b* and 95*c* for the passage of padlock members or bows. Latch 92 further comprises an end 96 which, when passing through an elongated handgrip slot 98, can penetrate into slot 97 of the box-like cover 12 allowing a fastening of handle 16 with respect to the cover 12 and the consequent padlocking of the handgrip itself. Latch 92 is driven by a spring 100, abutting against a protrusion 101 provided on the latch. Spring 100 is housed in an enlarged slot 102. Spring 100 urges latch 92 to move into the position depicted in the FIGS. 9 and 10, in which the protrusion 94*c* of the latch 92 abuts against a stop 104 provide in the handgrip 22.

Latch 92 must be intentionally pushed into the padlocking position, overcoming the force of the spring 100 and is able to reach such a position only if the padlocking conditions are met, which are substantially the same as for the embodiment of FIGS. 3–6.

Figure 7:
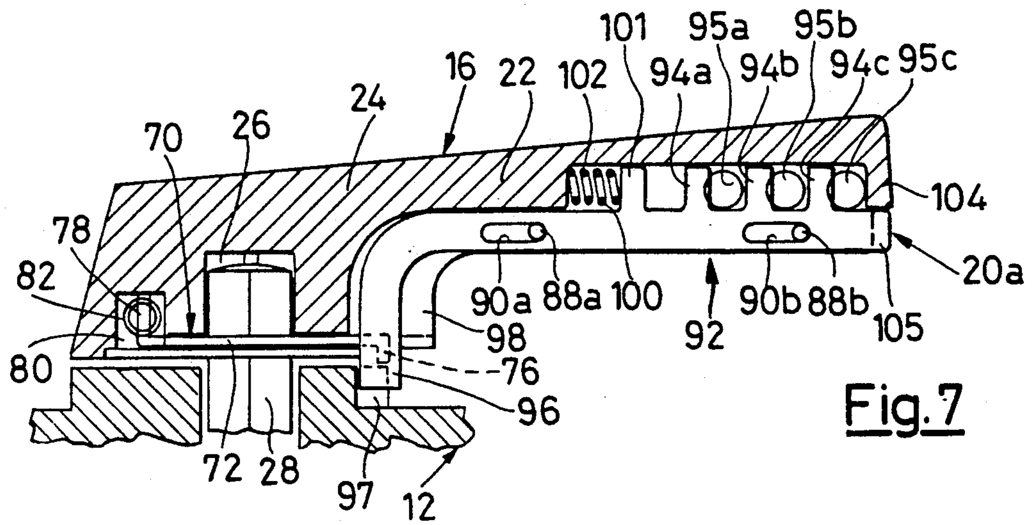
FIG. 7 is a sectional view of the handle for the rotating control of a second embodiment of the locking enabling device according to the present invention in a lockable position.
Figure 8:
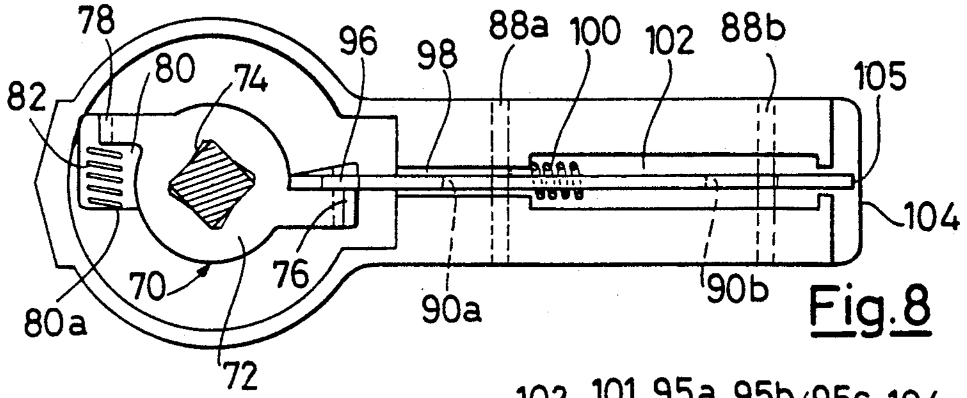
FIG. 8 is a view from the underside of the handle of FIG. 7, also in a lockable position.
Figure 9:
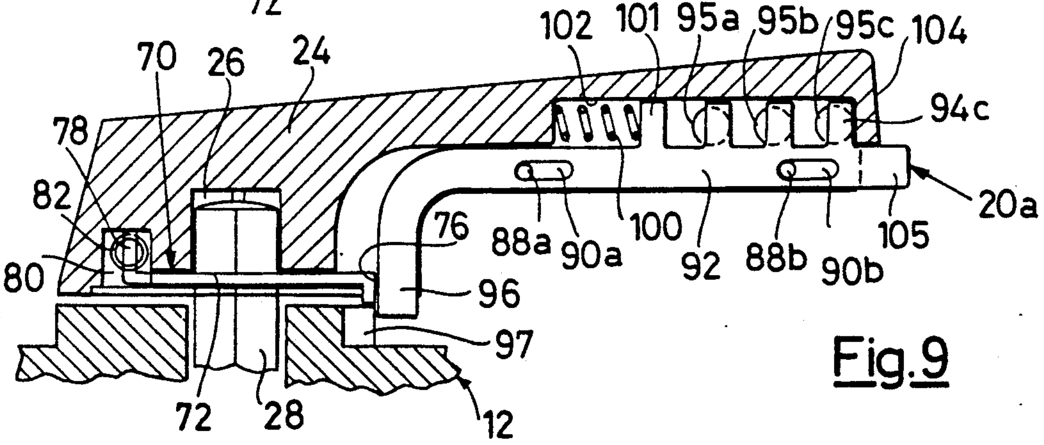
FIG. 9 is a sectional view of the handle of FIG. 7 in a non-lockable position.
Figure 10:
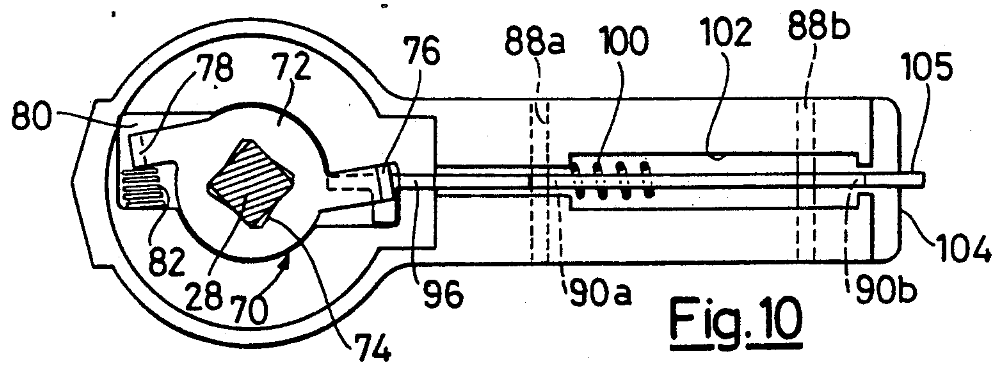
FIG. 10 is a view from the underside of the handle depicted in FIG. 9, also in a non-lockable position.
Figure 11:
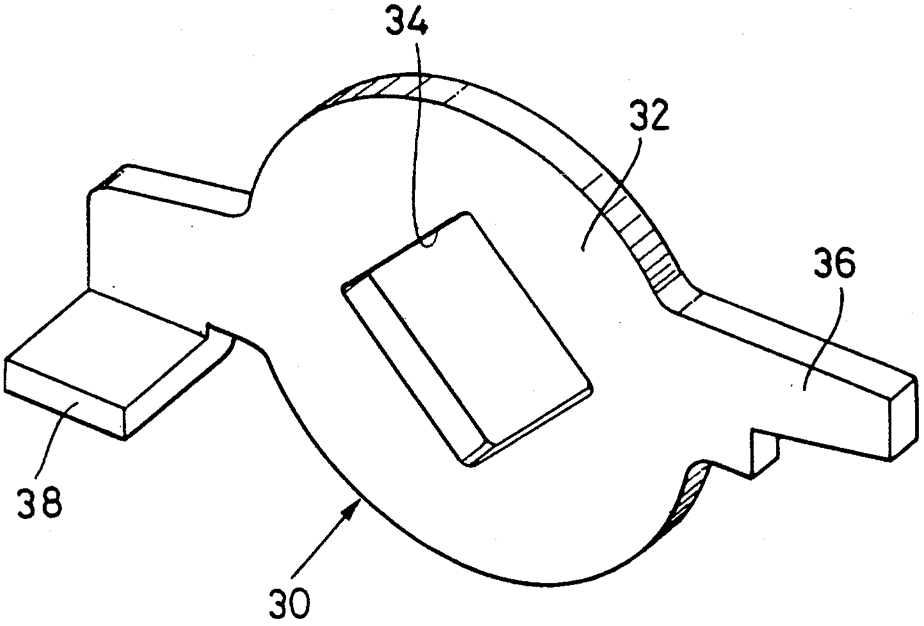
FIG. 11 is a perspective view of an enabling cam used in the handle depicted in the FIGS. 3 to 6.
Figure 12:
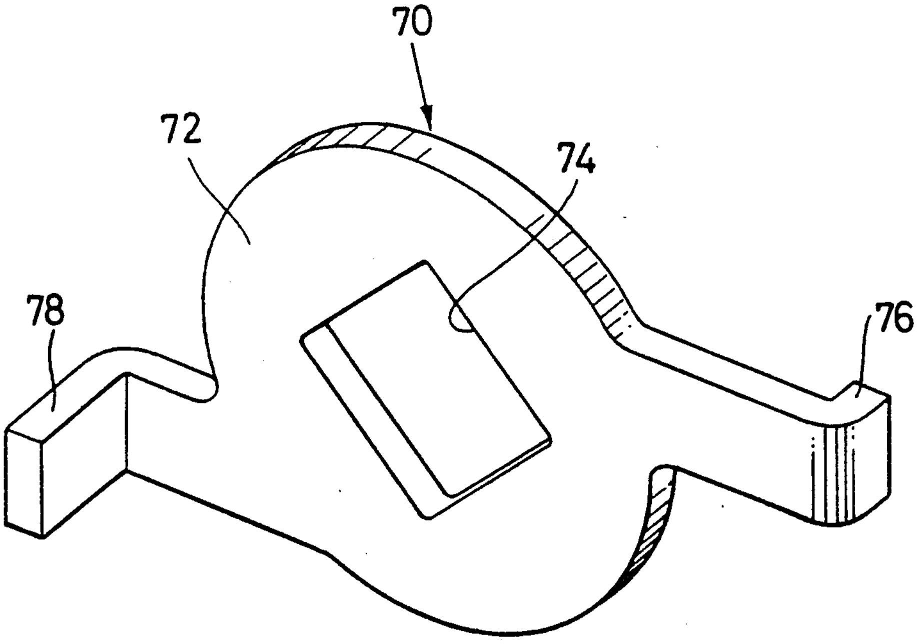
FIG. 12 is a perspective view of an enabling cam used in the handle depicted in the FIGS. 7 to 10.

In the case when the contacts of the circuit breaker 14 are in a proper open position, the padlocking enabling member 70 drives, through spring 82 abutting against the square finger 78, hub 24 and then handgrip 22 into the position shown in FIGS. 7 and 8, in which latch 92, if pressed on the end 105, can penetrate into slot 97 of the cover 12, because end 96 of latch 92 avoids the padlocking finger 76, so that protrusions 94*a*, 94*b* and 94*c* of the latch 92 clear holes 95*a*, 95*b* and 95*c* for the passage of padlock members insertable therein.

If a failure occurs in the circuit breaker 14, preventing the contact opening, for example in the case of contact welding, the same situation as that of the embodiment of FIGS. 3–6 as explained above, will take place. Namely, square shaft 28 would not be able to reach the position corresponding to that of the open contacts and thus handgrip 22 would not be positioned to make latch 92 penetrate into slot 97 to allow the padlocking. Not even an attempt to forcefully drive handgrip 22 into the opening position would allow a padlocking of the handle because, since the padlocking enabling member 70, owing to its central square bore 74 perfect fit on square shaft 28 and must exactly follow the orientation thereof, a forced movement of handgrip 22, which can occur because of the shape of the hollow seat 26, and overcome the force of spring 82, would drive the rotating handle 16 into the position depicted in the FIGS. 9 and 10, in which latch 92 having end 96 thereof abutting against square finger 76, would prevent the entry of the latch end into slot 97 of cover 12, thus preventing the padlocking of handgrip 22 due to a malfunction of the circuit breaker 14.

Reference is now made to FIGS. 13*a*, 13*b*, 14*a*, 14*b*, 15*a*, 15*b*, 16*a*, 16*b*, 17*a*, 17*b*, 18*a*, 18*b*, 19*a*, 19*b* and 20*a*–20*c* depicting a third embodiment of the invention. In this embodiment, the rotation clearing, producing the padlocking, does not occur between a rotary handle and a shaft connected to the mechanism for transmitting a rotary movement into linear alternating movement, but rather between a shaft rigidly connected to a rotary handle and a disk, having a peripheral cam profile, provided with a central hole having the shape similar to two superimposed squares, circumferentially shifted one relative to another, and having size somewhat greater than that of the shaft which has accordingly a square cross-section.

Figure 13A:
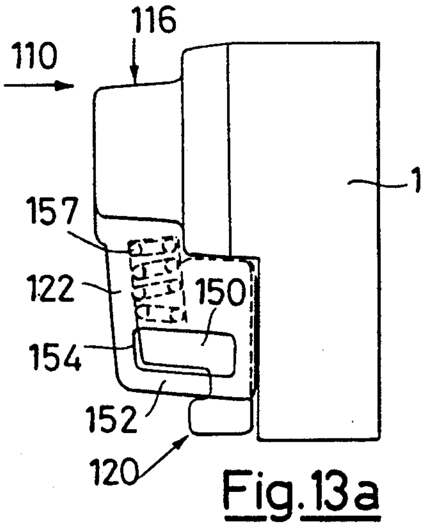
FIG. 13*a* is a schematic side view of a control device according to a third embodiment with the handle in a closed but non-lockable position.
Figure 13B:
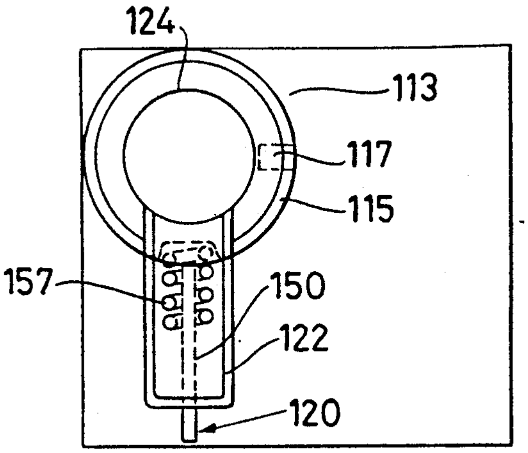
FIG. 13*b* is a schematic front view of the control device of FIG. 13*a*, also showing the handle in the closing position, wherein a latch in a position to prevent the locking thereof.
Figure 14A:
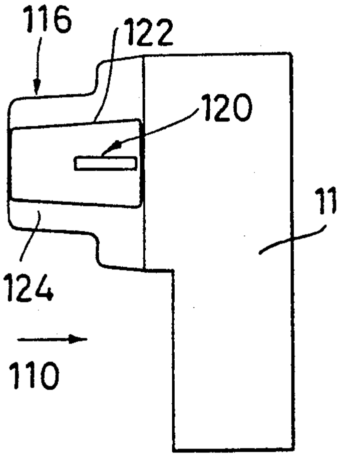
FIG. 14*a* is a schematic side view of the control device of the third embodiment of the present invention with the handle in an open and lockable but non-locked position.
Figure 14B:
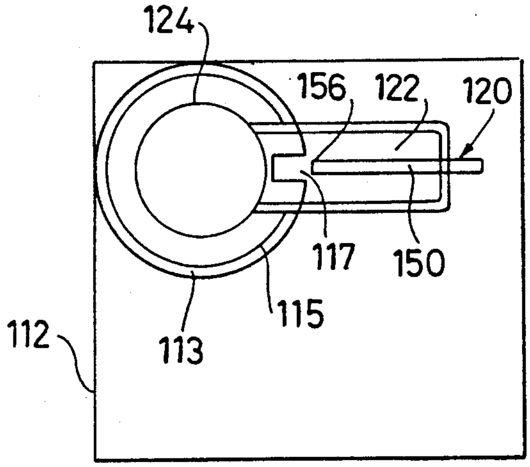
FIG. 14*b* is a schematic front view of the control device of FIG. 14*a*, showing the handle in the same open and lockable, but non-locked, position.
Figure 15A:
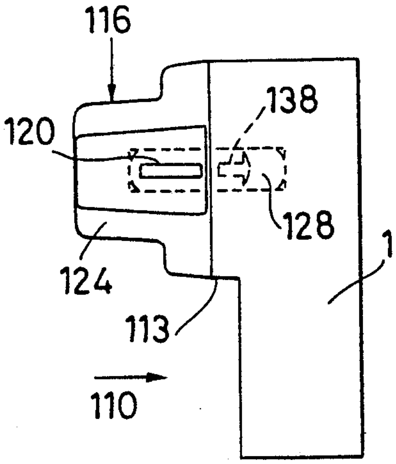
FIG. 15*a* is a schematic side view of the control device of the third embodiment of the present invention with the handle in an open and lockable position.
Figure 15B:
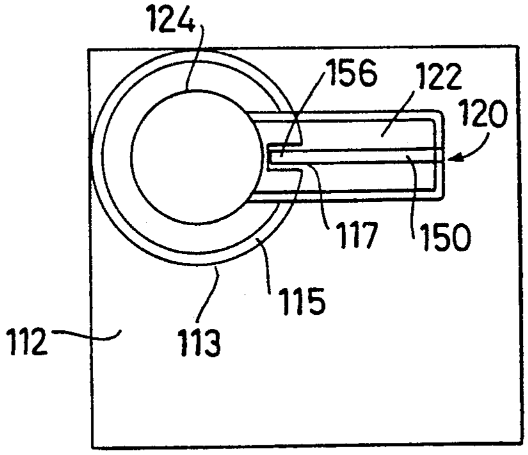
FIG. 15*b* is a schematic front view of the control device of FIG. 15*a* also showing the handle in the open and lockable position.
Figure 16A:
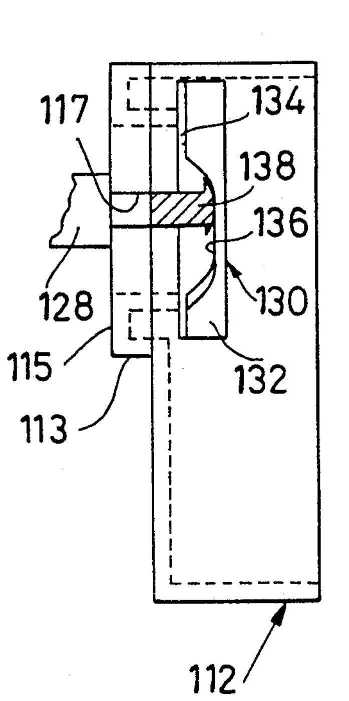
FIGS. 16*a* and 16*b* depict, respectively, a side and a front view, of the control device in the position of carrying out the padlocking operation provided by a disk having a cam profile and arranged in the handle, of the third embodiment, in the case when the circuit breaker controlled by the rotary handle, properly opens the contacts on command.
Figure 16B:
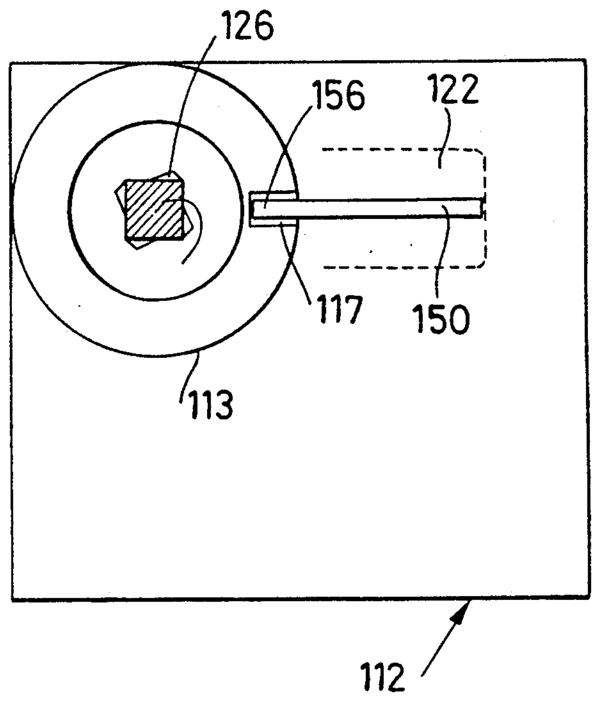

Referring to FIGS. 13 to 15, it will be seen that the padlocking enabling device according to the third embodiment of the present invention is connected to a rotary control device 110 comprising a box-like cover 112 which is applied to an electric equipment, as a circuit breaker (not shown). A rotary handle 116 includes a padlocking device 120 which can be longitudinally moved similarly to device 20*a* shown in FIGS. 7 to 10. Rotary handle 116 comprises a handgrip 122 fit on a hub 124 from which protrudes shaft 128 of a square cross-section, provided that it can be inserted in a padlocking enabling member 130 positioned inside the box-like cover 112 under the hub 124. The padlocking enabling member 130 is shown in FIGS. 16 to 19 and is depicted in detail in FIGS. 20*a*, 20*b* and 20*c*. The box-like cover 112 under hub 124 of the rotary handle 116 has a raised pad 113 provided with a circumferential raised edge 115 interrupted by a slot 117 which houses a latch member 150 (FIGS. 13*b* and 14*b*), resembling the latch member 92 shown in the FIGS. 7 to 10. Latch member 150 is able to enter with its end 156 into slot 117 and is provided with a recess 152 (FIG. 13*a*) which can align with a window 154 formed in handgrip 122 of the handle 116 when the padlocking conditions are met. Latch 150 is normally held out of the handgrip 122 by means of a spring 157 arranged between the inside wall of the hub 124 and a recess of latch 150.

Figure 20A:
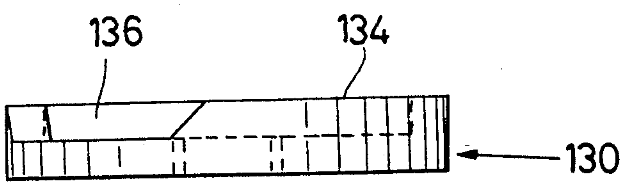
FIGS. 20*a* , 20*b* and 20*c* depict, respectively a side, front and perspective views of the cam profile-disk of the third embodiment of the present invention.
Figure 20B:
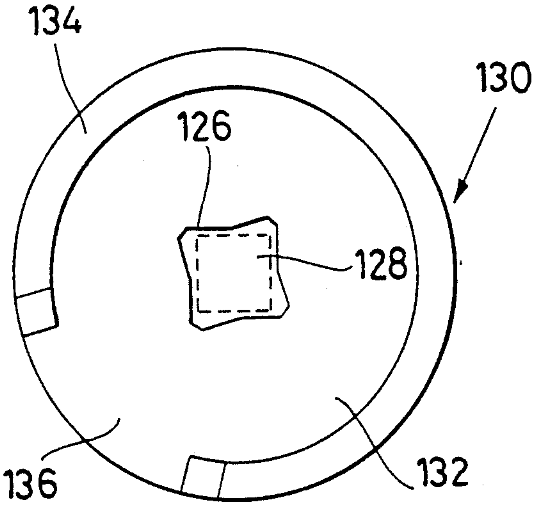
Figure 20C:
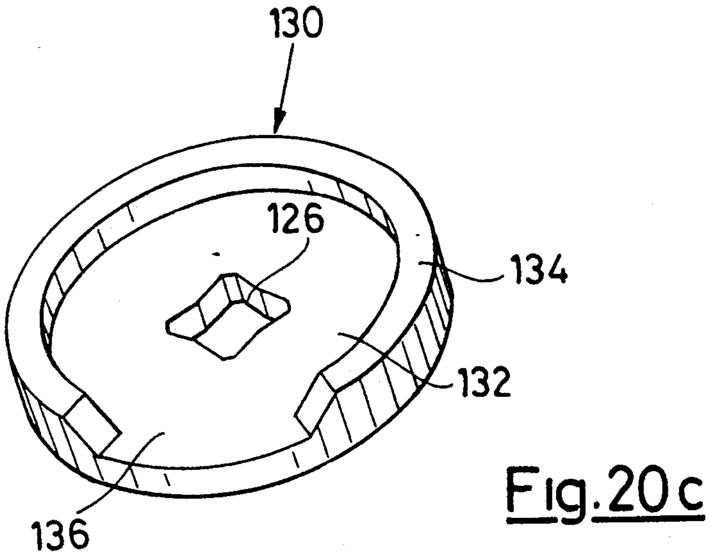

As shown in FIGS. 20*a*, 20*b* and 20*c*, the padlocking enabling member 130 has a disk 132 provided with a central bore 126 having the shape of two circumferentially offset superimposed squares, and having a little larger size to obtain the above-described large wrench effect. Disk 132 is provided on the periphery thereof with a raised cam profile portion 134 having an interruption or depression 136 engaging a padlocking enabling member in the form of a slider 138 (FIGS. 16*a*, 16*b*, 17*a*, 17*b*, 18*a*, 18*b* and 19*a*, 19*b*), which can either enter in or come out from the slot 117, since it is positioned above the cam profile portion 134 or depression 136.

The operation of this third embodiment is as follows: When rotary handle 116 is in an open position and the underlying circuit breaker is properly open, disk 132 of member 130, driven by any suitable mechanism connected to the circuit breaker, is positioned with the depression 136 under the slider 138 which descends to the position depicted in the FIGS. 15*a* and 16*a*. At this time, latch 150 can be driven into the handgrip 122, aligning the recess 152 with the window 154 and thus allowing the entry of the end 156 into slot 117 and thus the movement of a padlock member (bow) thereinto and the padlocking of the circuit breaker in the open position.

If, for some reasons, such as contact welding, the opening movement of the contacts of the circuit breaker should not be complete, the handgrip 122 of the handle 116 remains in the position, not allowing the end 156 of latch 150 to be aligned with slot 117, thus preventing the padlocking of handle 116.

Figure 17A:
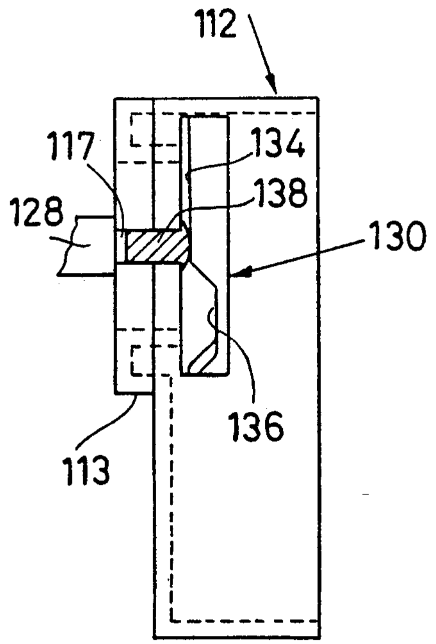
FIGS. 17*a* and 17*b* depict, respectively, a side and a front view of the control device in the position of carrying out a disabling operation of the padlocking, provided by the disk of FIGS. 16*a* and 16*b* in the case when the circuit breaker, controlled by the rotating to open the contacts, does not succeed, for example due to welding.
Figure 17B:
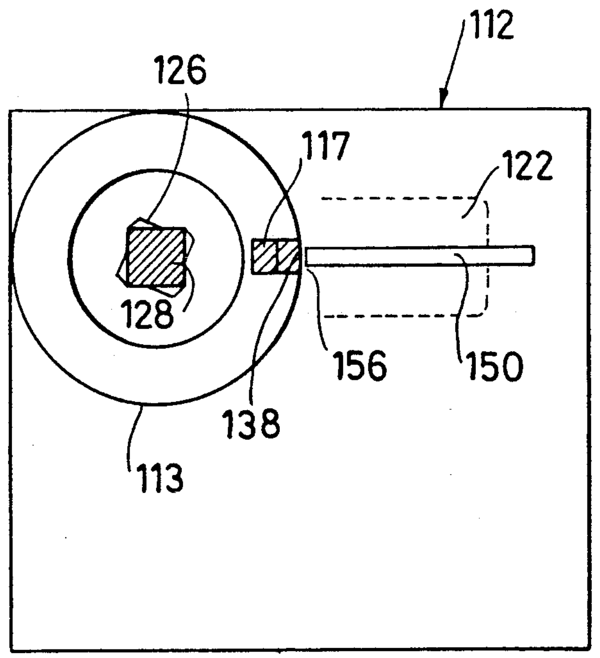
Figure 18A:
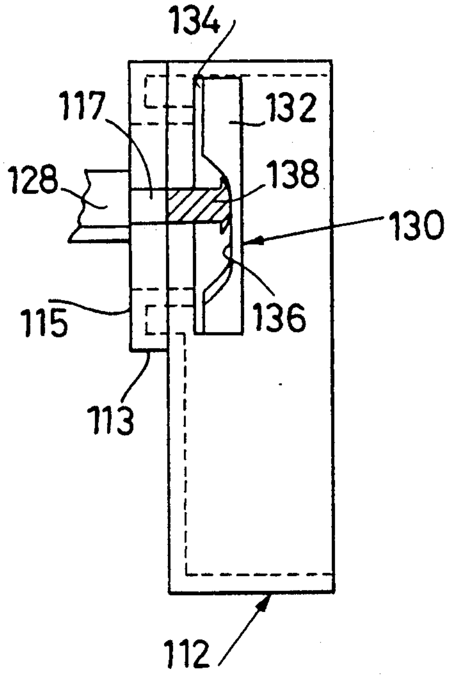
FIGS. 18*a* and 18*b* depict, respectively, a side view and a front view of the control device in the position of carrying out a disabling operation of the padlocking due to lack of an alignment between the latch and a slot formed at the base of the handle, which occurs when people would try to force the lever to rotate from the open to the reset position.
Figure 18B:
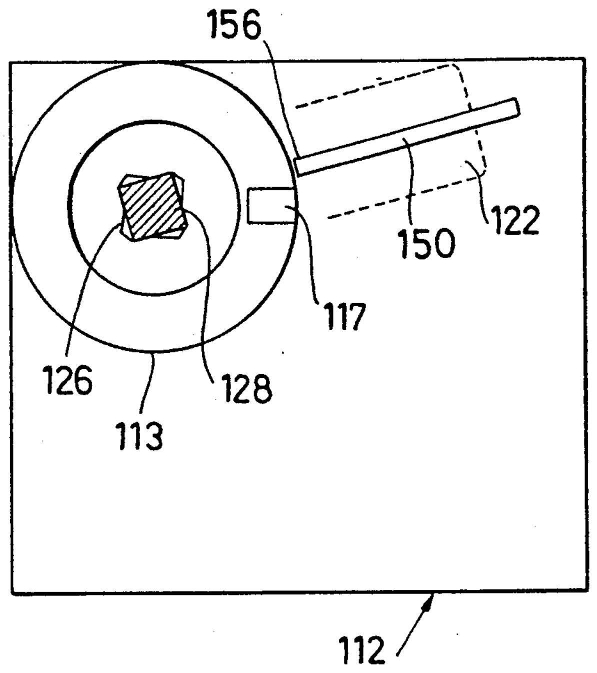
Figure 19A:
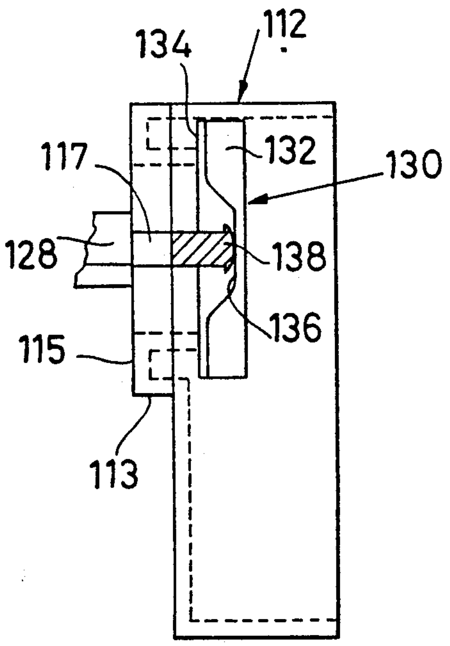
FIGS. 19*a* and 19*b* depict, respectively, a side view and a front view of the control device in the position of carrying out a disabling operation of the padlocking due to lack of an alignment between the latch and the slot, which occurs when people would try to maintain the lever in the reset position.
Figure 19B:
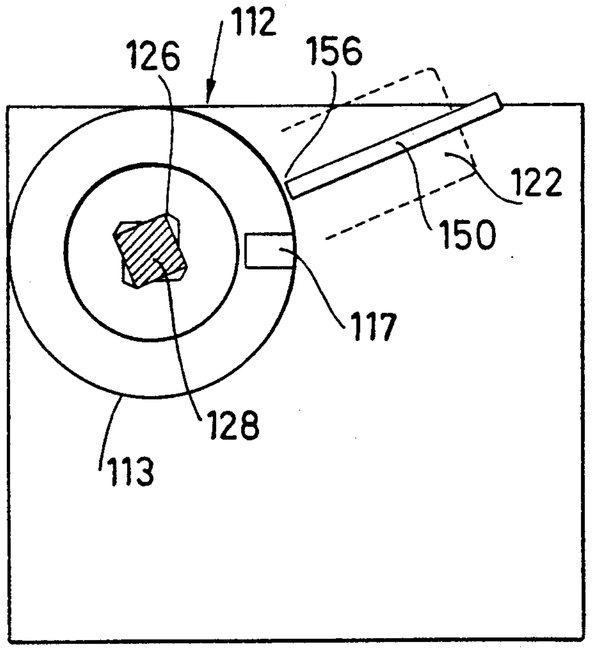

If the handgrip 122 is forced into the open position, the central bore 126 of the cam disk 132 of the double square shape and having a clearance with respect to the shaft 128 inserted thereinto would make disk 132 to remain in the position depicted in FIGS. 17*a* and 17*b*, in which the raised cam profile portion 134 driving the slider 138 in the raised position, would prevent entry of the end 156 of latch 150 into the slot 117 and thus the padlocking of handle 116.

Even forcing of the handgrip 122 to a reset position would never allow the padlocking of handle 116 because, even if (as depicted in the FIGS. 18 and 19) the slider 138 can move on the interruption or depression 136 of the cam profile portion 134 thus clearing slot 117, the end 156 of the latch 150 in these two positions would be no longer aligned with slot 117, and the padlocking would be prevented.

What has been hereabove set forth depicts some embodiments of the present invention, and should not be considered in a limiting way, and it will be obvious that those skilled in the art of the invention will be able to devise, from the reading of the above description, many alternate and equivalent approaches, logically and directly inferrable from the above disclosure, all to be considered as here covered.

I claim:

1. A locking device for locking a rotary control device of a mechanical equipment, comprising a rotating control handle including a hub and a handgrip connected to said hub; a shaft extending between said hub and a cover of the mechanical equipment; and padlock means including a padlocking enabling member positioned on said shaft to move therealong, a movable latch lever cooperating with said padlocking enabling member, and a padlock member cooperating with said lever so as to block said rotating control handle in a predetermined position, said shaft having a substantially square cross-section, said hub having a double square bore formed by two superimposed squares circumferentially offset one relative to another, said double square bore being of a size slightly greater than that of said shaft and receiving said shaft with a clearance; and spring means for biasing said padlocking enabling member, said padlocking enabling member together with said shaft being able to angularly move within said clearance so as to clear said lever from engagement with said padlocking enabling member when the electromechanical equipment has properly open contacts and to cause said padlocking enabling member to cooperate with said lever when the electromechanical equipment has improperly open contacts.

2. The locking device as in claim 1, wherein said padlocking enabling member has a first finger cooperating with said lever and a second finger, said spring means abutting on said second finger.

3. The locking device as in claim 1, wherein said padlocking enabling member has a central bore of square configuration and includes a disk, a first substantially planar finger at one side of said disk and a second finger of a square configuration at an opposite side of said disk, said latch lever having a fulcrum and two elongated arms connected at said fulcrum, one of said arms having an abutment end cooperating with said first finger, wherein said first finger operates as an interference member with said lever to prevent a rotation of said arms around said fulcrum, said abutment end of one of the lever arms acting on said first finger and if, after an opening operation of said rotary handle the contacts of the electromechanical equipment are not open and a forcing of the handle to an opening position shifts the double square bore of said hub, by overcoming a force of said spring means and said second finger of the padlocking enabling member, the abutting end of said arm of said lever moves over said first finger remaining prevented from descending into a slot in said cover to allow a padlocking of the rotating handle.

4. A locking device as in claim 3, wherein another of said arms is provided with a padlocking bracket having a slot for engagement of said padlock member.

5. A locking device as in claim 2, wherein said padlocking enabling member has a square central bore, said shaft being tightly fit in said central bore, said latch lever having a plurality of protrusions, said padlocking enabling member including a disk provided with a first square padlocking finger arranged at one side of the disk and a second square engagement finger connected to said disk and arranged on an opposite side of said disk, said latch lever having a first arm and a second arm, said first finger cooperating as an interference member with said latch lever to prevent entry of one of said arms of said latch lever in a slot of the electromechanical equipment and shift said latch lever within the rotary handle for clearing padlocking holes from said protrusions of the latch lever, one of said arms having an abutment end acting on said first finger, and if, after an opening operation of the rotary handle, contacts of the electromechanical equipment do not open and a forcing of the handle to an open position causes shifting of the double square bore of said hub, by overcoming a force of said spring means, said abutment end moves against said first finger, remaining prevented from coming into said slot to allow a padlocking of the rotary handle.

6. A locking device as in claim 5, wherein a spring is provided to hold said latch lever in a predetermined position so that padlocking is effected by pushing said latch lever towards said padlocking enabling member against a force of said spring provided that said first finger does not engage with said abutment end.

7. A locking device as in claim 1, wherein said padlocking enabling member is a disk having a peripherally raised cam profile portion interrupted by a depression, said raised cam profile portion having an abutting slider, which, upon abutment on the highest raised area of said cam profile portion, comes out of engagement from a cover of the electromechanical equipment into a slot in the rotary handle, said slider filling said slot when it abuts on the highest area, to prevent entry of said latch lever into said slot.

8. A locking device as in claim 7, wherein said latch lever is provided with a recess aligning with a corresponding window formed in said handgrip for passing therethrough said padlock member when the handle is rotated to an open position and the contacts of the electromechanical equipment are properly moved into the open position allowing said depression of said cam profile portion to move under said slider so that slider clears said slot permitting said abutment end of the latch lever to enter into said slot.

9. A locking device as in claim 8, further comprising a spring for holding said latch lever in a normally protruding position for closing said window, said latch lever being driven towards said padlocking enabling member to clear said window when the rotating handle is in an open position and the contacts of the electromechanical equipment properly open.

* * * * *